United States Patent [19]

Tsubota

[11] Patent Number: 4,779,153
[45] Date of Patent: Oct. 18, 1988

[54] BRAKE CONTROL MECHANISM FOR MAGNETIC RECORDING AND REPRODUCING APPARATUS

[75] Inventor: Shinya Tsubota, Mito, Japan
[73] Assignee: Hitachi, Ltd., Tokyo, Japan
[21] Appl. No.: 66,957
[22] Filed: Jun. 29, 1987

[30] Foreign Application Priority Data

Jun. 27, 1986 [JP] Japan .................................. 61-149513

[51] Int. Cl.⁴ ............................................. G11B 15/00
[52] U.S. Cl. ....................................... 360/96.5; 360/85
[58] Field of Search ......................... 360/85, 84, 95, 93, 360/96.1, 96.3, 96.5, 130.21-130.23

[56] References Cited

U.S. PATENT DOCUMENTS

| | | | |
|---|---|---|---|
| 4,573,090 | 2/1986 | Tsuchiya | 360/85 |
| 4,611,251 | 9/1986 | Yokoo | 360/85 |
| 4,642,712 | 2/1987 | Kohda | 360/85 |

Primary Examiner—John H. Wolff
Attorney, Agent, or Firm—Antonelli, Terry & Wands

[57] ABSTRACT

A magnetic recording and reproducing apparatus has main and sub chassis relatively movable between a first position in which a tape cassette is allowed to be mounted on and demounted from the reel bases and a second position in which magnetic tape extracted from the tape cassette is wound on the head assembly for recording or reproduction of electric signals. The apparatus has a braking mechanism designed for producing a braking effect on at least one of the reel bases when the sub chassis is in the first position. When the sub chassis is in the second position, the braking mechanism is engaged with a brake actuating mechanism on the main chassis so as to selectively brake the reel base in accordance with the state of the brake actuating mechanism operative in response to a manual input.

7 Claims, 3 Drawing Sheets

BRAKE CONTROL MECHANISM FOR MAGNETIC RECORDING AND REPRODUCING APPARATUS

BACKGROUND OF THE INVENTION

The present invention relates to a magnetic recording and reproducing apparatus which has an improved brake control mechanism. More particularly, the present invention is concerned with a magnetic recording and reproducing apparatus such as an 8 mm video tape recorder designed for recording and reproducing electric signals in a narrow metallic tape of 8 mm wide and housed in an extremely small cassette of 95×62.5×15 mm. Still more particularly, the invention is concerned with a brake control mechanism which has a simple and small-sized construction suitable for use in a compact video tape recorder of the type mentioned above.

Japanese Patent Laid-Open Publication No. 163264/1985, which was laid open to public inspection on Aug. 26, 1985, discloses an apparatus in which tape is extracted from and retracted into a tape cassette by parallel relative movement between a first base plate (referred to as a "sub chassis" hereinafter) carrying the tape cassette thereon and a second base plate (referred to as a "main chassis" hereinafter) carrying a rotary head assembly thereon. In the design of this known apparatus, however, no specific consideration is given as to which one of the right and left reels the tape is extracted from in the loading and unloading of the tape. In addition, no suggestion is made as to the manner in which the reel bases are braked during the loading and unloading of the tape. In consequence, it is often experienced with this known apparatus that, when a demounted tape cassette is mounted once again for the purpose of tape loading, the tape is extracted from both the supply reel and the take-up reel depending on the amounts of tape on the reel hubs. The extraction of the tape from the take-up reel causes the following problem: Namely, since the portion of the tape extracted from the take-up reel is wound on the rotary head cylinder, signals recorded in this portion of the tape, i.e., the end portion of the information recorded in the preceding recording operation, is undesirably erased because new signals are recorded in this portion of the tape when the recording is re-started. This problem would be overcome if a suitable braking mechanism could be mounted on the apparatus. In the apparatus of the type in which the extraction and retraction of the tape rely upon the parallel relative movement between the main and sub chassis, however, it is very difficult to find out a sufficient space for mounting the braking mechanism, including an actuating power source, on the restricted area of the sub chassis which carries the cassette.

SUMMARY OF THE INVENTION

Accordingly, an object of the present invention is to provide a magnetic recording and reproducing apparatus of the type referred to above and which is provided with an improved braking mechanism having a simplified construction but yet being capable of functioning without fail.

In order to achieve this object, the magnetic recording and reproducing apparatus according to the present invention includes a braking mechanism provided additionally for at least one of supply and take-up reel bases, preferably for the take-up reel base. The braking mechanism is operative to apply a braking force to the at least one reel base when the tape is in unloaded position in a cassette mounted on the apparatus. After the tape is set in a loaded position, the braking mechanism is brought into driving engagement with an actuating power source on a main chassis of the apparatus to brake the at least one reel base in a controlled manner.

In a preferred embodiment of the invention, a sub chassis is movable relative to and in parallel with the main chassis and carries thereon a brake arm which is resiliently biased by a biasing means, such as a spring, to apply a braking force to the at least one reel base. More specifically, when the tape is in loaded and unloaded positions, a pair of first brakes for braking both reel bases are released but a second brake applies a braking force solely to the take-up reel. A transmission member is provided for transmitting a force from an actuating power source on the main chassis to the braking mechanism on the sub chassis after a loading of the tape is completed. Therefore, once the tape loading operation is completed, both the first and second brakes are actuated to selectively brake and release the associated reel bases. The transmission of the force from the main chassis to the sub chassis is effected only after the comletion of the tape loading operation. When the tape is in the unloaded position, the first and second brakes are both biased in one direction.

The above and other objects, features and advantages of the present invention will be made more apparent by the following description with reference to the accompanying drawings.

DESCRIPTION OF THE PREFERRED EMBODIMENT

Figure 1:
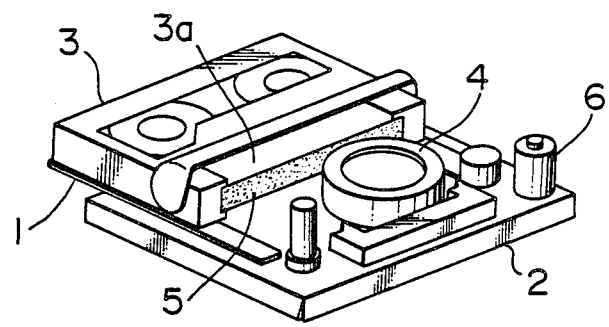
FIG. 1 shows, in perspective view, main and sub chassis of an 8 mm video tape recorder of an embodiment of the present invention with a tape cassette mounted on the tape recorder.
Figure 2:
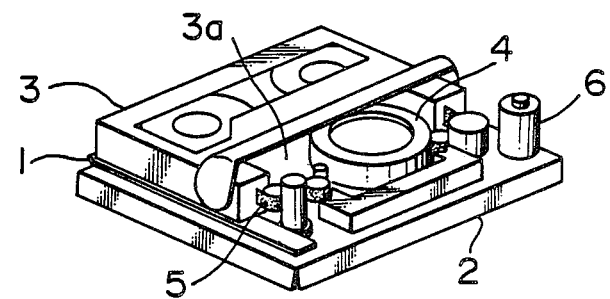
FIG. 2 is generally similar to FIG. 1 but shows the main and sub chassis in positions taken after the completion of a tape-loading operation.

FIG. 1 illustrates an embodiment of the apparatus in accordance with the present invention with a tape cassette shown mounted thereon and with a tape in an unloaded position. A sub chassis 1 is movable in parallel with the major plane of the main chassis 2. The sub chassis 1 carries an 8 mm tape cassette placed in a predetermined position, i.e., with its reel hubs fitting on the reel shafts on reel bases supported by the sub chassis 1. FIG. 2 shows the apparatus with the tape placed in the loaded position. It will be seen that the sub chassis 1 has been moved from the FIG. 1 position to a position where a front opening 3a of the cassette 3 partially receives a rotary head 4 about which the tape is wound, so that the external dimensions of the structure including both the sub chassis 1 and the main chassis 2 have been decreased. As is well known to those skilled in the art, the movement of the sub chassis 1 from the position shown in FIG. 1 to the position shown in FIG. 2 is effected by a loading motor 6 which is operated when a switch (not shown) is turned on in response to the mounting of the 8 mm tape cassette 3 on the sub chassis 1.

Figure 3:
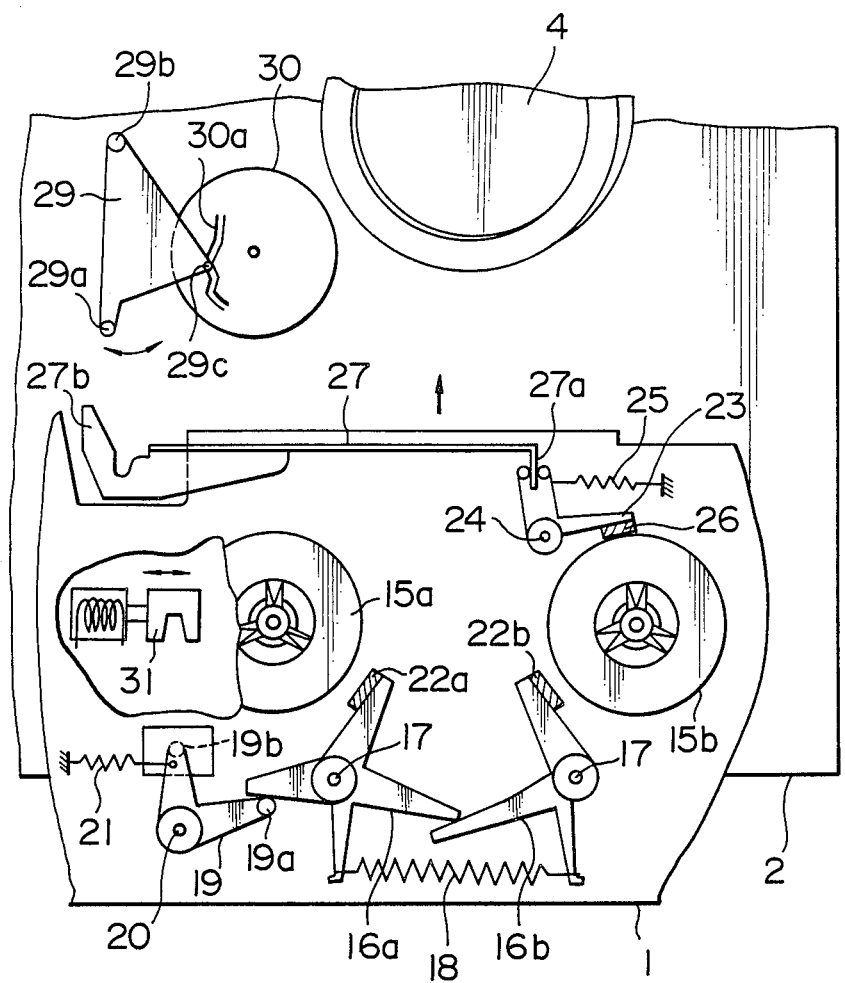
FIG. 3 is an enlarged fragmentary plan view of the apparatus in accordance with the present invention, with the tape cassette removed for the purpose of showing important elements of the invention.

FIG. 3 is an enlarged plan view of essential parts of the apparatus as observed when the tape is in the unloading position shown in FIG. 1. The main chassis 2 carries a rotary head cylinder 4, a cam gear 30 adapted to be driven by a loading motor 6 shown in FIG. 1, an arm 29 adapted to cooperate with the cam gear 30, and an actuating member 31 adapted to be dirven by, for example, a solenoid. The actuating member 31 may alternatively be driven by the loading motor 6, as is the can gear 30. Although not shown, the main chassis 2 also carries other various parts known per se, such as tape guide members for extracting the tape to a predetermined running path, a capstan motor for actuating the tape, and a pinch roller.

On the other hand, the sub chassis 1 carries left and right reel bases 15a and 15b, and first brakes 16a and 16b which are adapted to apply braking forces to both reel bases. The first brakes 16a and 16b are pivotally supported by respective pivot pins 17 and 17. A spring 18 is provided between one ends of both first brakes 16a and 16b. One of the first brakes 16a is contacted at a portion thereof by one end 19a of an actuating lever 19 which is pivotally mounted on a pivot pin 20. The actuating lever 19 is biased counterclockwise as viewed in FIG. 3 by a spring 21. The magnitudes of strengths of the spring 21 and the spring 18 are so selected that, in the normal state, the effect of the spring 21 is large enough to maintain both first brakes 16a, 16b and the actuating lever 19 in the illustrated positions, overcoming the force produced by the spring 18. In consequence, brake pads 22a and 22b of the first brakes 16a and 16b are kept away from the reel bases 15a and 15b. The other end 19b of the actuating lever 19 opposes the actuating member 31 on the main chassis 2.

According to the present invention, the apparatus has a second brake 23 which is pivotally supported by a pivot pin 24 and biased by a spring 25 so as to bring a pad 26 on one end thereof into contact with the reel base 15b. The pad 26 produces, when held in contact with the reel base 15b, a certain level of braking torque. The end of the second brake 23 opposite to the pad 26 engages with one end 27a of a slider 27, so that rightward and leftward movements of the slider 27 bring the brake pad 26 into and out of contact with the reel base 15b thereby selectively braking the reel base 15b. It is to be noted that the other end 27b of the slider opposes a pin 29a on the arm 29 on the main chassis 2. The arm 29 is pivotable about a pivot pin 29b. The arm 29 also has a portion 29c which is received in a cam groove 30a of a suitable contour formed in the cam gear 30 which is adapted to be driven by the loading motor. Thus, the arm 29 is driven as the portion 29c thereof follows the cam contour of the cam groove 30a formed in the cam gear 30.

Figure 4:
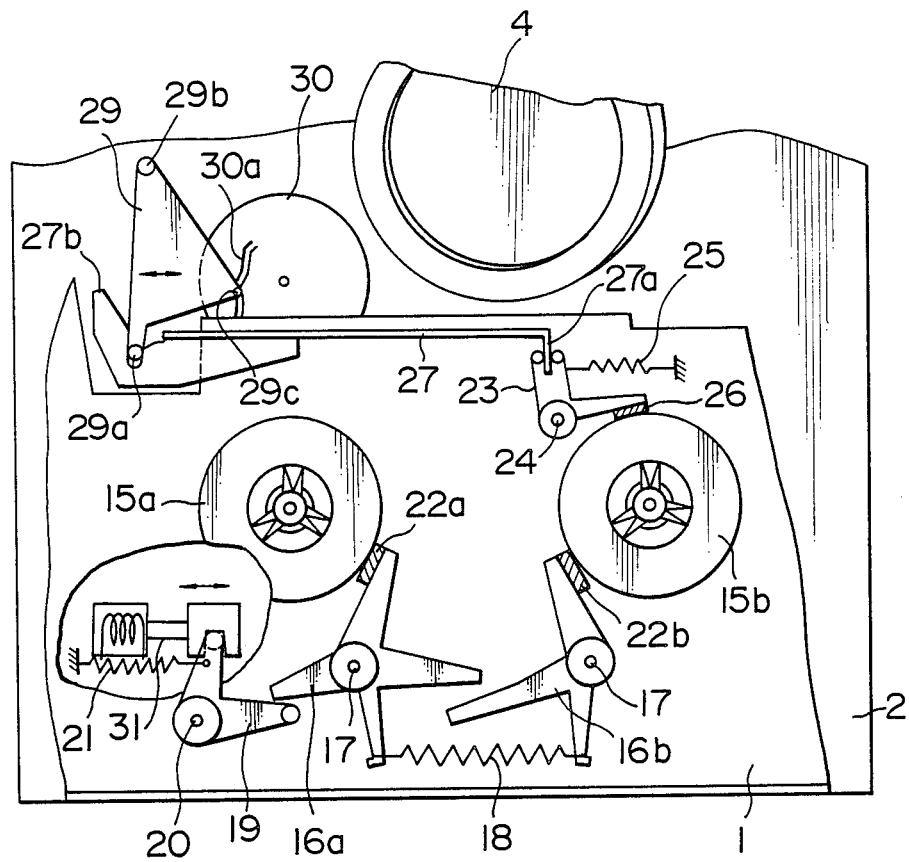
FIG. 4 is generally similar to FIG. 3 but illustrates the elements after the tape loading.

The switching of the apparatus from the state shown in FIG. 3 in which the tape is in the unloading position to a state shown in FIG. 4 in which the tape is in the loaded position is effected by the rotation of the cam gear 30 which in turn is caused by the operation of the loading motor 6 shown in FIGS. 1 and 2. More specifically, the sub chassis 1 has a groove which slidingly receives a pin provided on a cam gear (not shown) which is connected to the cam gear 30 so that, when the tape loading operation is commenced, the sub chassis 1 is moved towards the rotary head cylinder 4, from the position shown in FIG. 1 to the position shown in FIG. 2. After the completion of the tape loading operation, the pin 29a on the arm 29 is held in engagement with the end 27b of the slider 27. The arm 29 is swung as the cam gear 30 rotates, so that the slider 27 is moved so as to suitably control the second brake 23. Meanwhile, the other end 19b of the actuating lever 19 engages with the actuating member 31 so as to selectively cohtrol the first brakes 16a and 16b in accordance with the leftward and rightward movement of the actuating member 31.

The cam gear 30 is adapted to be rotated over a predetermined small angle when a play button (not shown) is depressed. More specifically, when the play button is actuated by a user, the cam gear 30 is rotated, so that the apparatus is brought into a playing mode of operation. As a result, the slider 27 is moved leftwards, as viewed in FIG. 3, to allow the brake pad 26 to be moved away from the reel base 15b, thereby releasing the reel base 15b. When it is required to rotate the reel basis 15a and 15b, the actuating member 31 can be driven by the above mentioned solenoid which can be energized, in a known manner, by a control electrical signal produced when the play button is actuated.

It will be understood from the foregoing description that the braking mechanism provided by the present invention has a simple construction and, hence, contributes to a reduction in the size and weight of the magnetic recording and reproducing apparatus.

What is claimed is:

1. A magnetic recording and reproducing apparatus, including:

a main chassis;

a sub chassis movable relative to and in parallel with said main chassis between a first position in which a tape cassette can be mounted on and demounted from said apparatus and a second position in which electric signals can be recorded on and reproduced from a magnetic tape contained in said cassette;

said sub chassis carrying thereon a pair of reel bases adapted to receive said tape cassette thereon, said sub chassis being cooperative with said tape cassette to feed and take up said magnetic tape, brake means for applying suitable braking torque to at least one of said reel bases and brake control means for controlling the operation of said brake means; and said main chassis carrying thereon a rotary head drum on which said magnetic tape is to be wound over a predetermined angle so that electric signals are recorded on or reproduced from said magnetic tape, said brake control means and said brake means being mounted to apply a braking force to at least one of said reel bases when said main chassis and said sub chassis are in said first position, and brake actuating means engageable with said brake control means when said main chassis and said sub chassis are in said second position for actuating said brake control means causing said brake means to release said braking force in response to a signal indicating that electrical signals are to be reproduced from said magnetic tape.

2. A magnetic recording and reproducing apparatus according to claim 1, wherein said brake means includes a sub brake arm having a brake pad thereon and spring means for biasing said sub brake arm to apply a braking force to said at least one reel base when said main chassis and said sub chassis are in said first position.

3. A magnetic recording and reproducing apparatus according to claim 2, wherein said sub brake arm is pivotally mounted on said sub chassis and biased by said spring means to keep said brake pad in braking contact with said at least one reel base.

4. A magnetic recording and reproducing apparatus according to claim 3 further comprising:
   a plurality of second brake means mounted on said sub chassis wherein each second brake means is operative to apply a suitable braking torque to a reel base;
   a plurality of second brake control means, mounted on said sub chassis, wherein each second brake control means controls the operation of a second brake means, said plurality of second brake means and said plurality of second brake control means being mounted to apply a braking torque to said reel bases when said maind chassis and said sub chassis are in said first and second position respectively; and
   a second brake actuating means, mounted on said main chassis, wherein said second brake actuating means operably engages said plurality of second brake control means when said main chassis and said sub chassis are in said second position and includes means responsive to a signal indicating that electrical signals are to be reproduced from said magnetic tape, for actuating said plurality of second brake control means, causing said plurality of second brake means to release said braking torque being applied to said reel bases.

5. A magnetic recording and reproducing apparatus according to claim 4 wherein each second brake means includes a second sub brake arm having a second brake pad thereon and second spring means for biasing said second brake arm to apply a braking force to a reel base when said main chassis and said sub chassis are in said first and second position respectively.

6. A magnetic recording and reproducing apparatus according to claim 5 wherein each said second sub brake arm is pivotally mounted on said chassis and biased by said second spring means to keep said second brake pad in brake contact with a reel base.

7. A magnetic recording and reproducing apparatus according to claim 2, wherein said brake control means includes a slider and said sub brake arm is engaged with an end of said slider and the other end of said slider is positioned in opposite relationship to said braking actuating means.

* * * * *